(No Model.) 2 Sheets—Sheet 1.

A. E. WOOLF.
SECONDARY BATTERY PLATE.

No. 439,850. Patented Nov. 4, 1890.

WITNESSES:
D. C. Reusch.
F. C. Smith.

INVENTOR
Albert E. Woolf
BY Phillips Abbott
his ATTORNEY

THE NORRIS PETERS CO., PHOTO-LITHO., WASHINGTON, D. C.

(No Model.) 2 Sheets—Sheet 2.

A. E. WOOLF.
SECONDARY BATTERY PLATE.

No. 439,850. Patented Nov. 4, 1890.

WITNESSES:
D. C. Reusch.
F. C. Smith.

INVENTOR:
Albert Edw Woolf
BY Phillips Abbott
his ATTORNEY

UNITED STATES PATENT OFFICE.

ALBERT E. WOOLF, OF NEW YORK, N. Y.

SECONDARY-BATTERY PLATE.

SPECIFICATION forming part of Letters Patent No. 439,850, dated November 4, 1890.

Application filed February 13, 1890. Serial No. 340,374. (No model.)

*To all whom it may concern:*

Be it known that I, ALBERT E. WOOLF, a citizen of the United States, and a resident of New York city, in the county of New York and State of New York, have invented certain new and useful Improvements in Secondary-Battery Plates, of which the following is a specification.

My invention relates to a new and useful improvement in electrodes for secondary batteries; and it consists in peculiar construction of the electrodes, as hereinafter described.

In all the forms of my invention active material is placed between pieces or strips of metal or equivalent support for the same, the metal or its equivalent being disposed with its width extending across the plate; in other words, so that the strain consequent on the forming operation will be taken by the support edgewise. Thus the buckling or bending of the plates will be measurably, if not entirely, avoided; and since the supports extend entirely across the electrode they receive endwise support from the sustaining-bands which I place around the edges of the electrodes, as hereinafter set forth.

In certain respects my present invention resembles that which was patented by me in United States Letters Patent dated December 31, 1889, No. 418,483.

Figure 3:
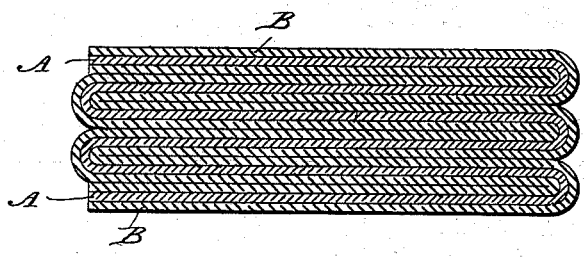
Figure 2:
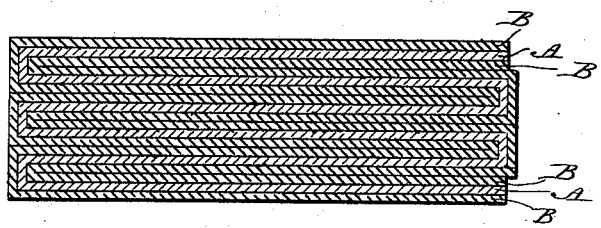
Figure 1:
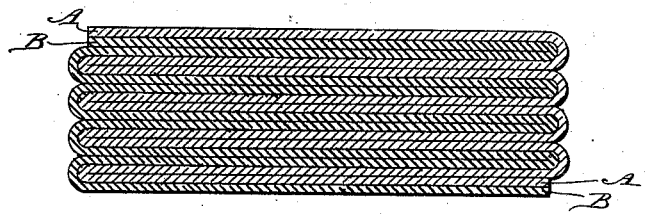
Figure 4:
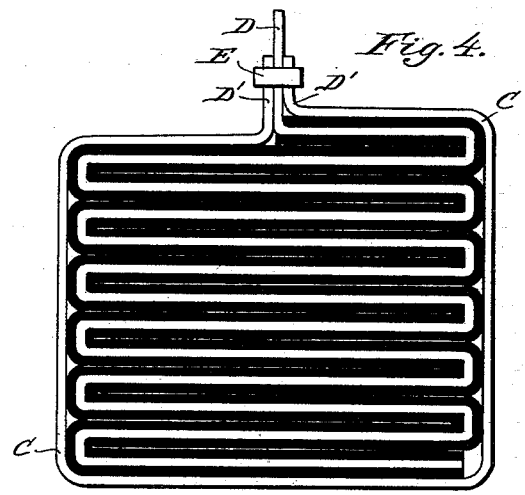
Figure 5:
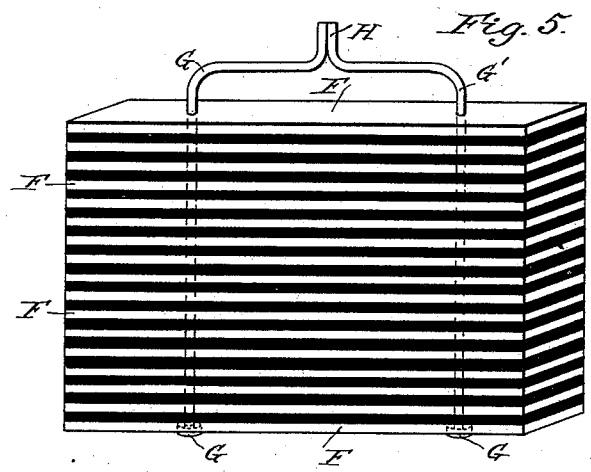
Figure 6:
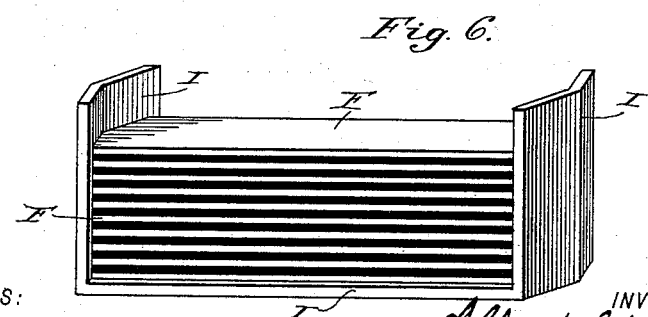

Figure 1 illustrates a part of an electrode in which the metal is coated on one side only, which when bent or disposed into zigzag form brings two thicknesses of metal and two thicknesses of active material into juxtaposition. Fig. 2 illustrates a part of an electrode having the same disposition of the metal and active material as shown in Fig. 3, and being the same in all respects, excepting that the edges are bent square instead of rounding. Fig. 3 illustrates a plate in which the metal is coated on both sides with active material and is then folded back and forth upon itself, whereby one thickness of metal is disposed between two thicknesses of active material, the edges of the combined metal and active material being rounded. Fig. 4 illustrates an elevation of an electrode made as shown in Fig. 3, with a sustaining-band around its edges. Fig. 5 illustrates a perspective of an electrode in which the support is in separate strips which are held together by wires or rods. Fig. 6 illustrates a perspective of an electrode, partly broken away, in which the support is in separate pieces and having interposed active material, the whole being surrounded by an edgewise sustaining-band.

In Figs. 1, 2, 3, and 4 of the drawings, A is the support, of metal or its equivalent, and B the active material. It will of course be understood that the thickness of the support as compared with that of the active material, and vice versa, will be such as desired to make the resulting electrode such as will best answer the purpose for which it is intended— that is to say, if it be desired that the active material and the support shall be of about equal thickness then if the electrodes be made with the active material on both sides of the support, as shown in Figs. 2 and 3, the layer of active material will be only one-half as thick as the support, because when folded, as described and shown in those figures, two thicknesses of the active material lie side by side, whereas one thickness only of the support is interposed between active material. In these figures, however, the active material is shown as twice as thick as the support, it and the active material being of equal thickness when the metal is flat before bending it into shape. On the other hand, when the electrode is made in the form shown in Fig. 1, the active material and the support should be of the same thickness when the same thickness of each is desired, because double thickness of each are present in the completed electrode. The relative thickness of the support and active material may, however, be such as experience and preference shall dictate.

It will be understood that the electrodes shown in Figs. 1, 2, 3, and 4 are made by folding the support back and forth in a zigzag form until it assumes the form of a bar, and the individual electrodes are then cut off after the manner of slices from the end of the bar, the slices being of such thickness that the support has greater width than thickness. The active material may be applied to the support either before or after it is folded, and instead of folding the support into the form of a bar and then cutting slices off from it, the metal may be in the form of a strip and then bent into the desired form.

In Fig. 4 I show an electrode made like that shown in Fig. 3, and having a sustaining band or clasp C applied to its edges. The band may be of material which is a conductor of electricity or not. Hard rubber is a good material for non-conducting bands. The upper end of the support D is turned upwardly, and is preferably clamped between the ends D' D' of the band in any suitable manner. I show a collar or ring E slipped over the ends of the band for this purpose.

In Figs. 5 and 6 I show two forms of my invention in which the main feature of it also appears—to wit., the disposition of the support in the form of flat plates edgewise to the buckling strain—in other words, across the plane of the electrode; but in these forms the support is not continuous, but in the form of separate strips F, which extend from side to side of the electrode having the active material B between them. The width of the support relative to length is somewhat excessive for illustration. In Fig. 5 the electrode is held together and the current is conducted to all the supports by wires or rods G G', which are conductors of electricity and which pass through holes in each support, making electrical contact with them. The connections with other electrodes are made at H. In Fig. 6 I show the same general construction as that shown in Fig. 5, excepting that the several flat supports are sustained by a band I, which surrounds the edges of the electrode. The band may be concave inwardly and the ends of the supports made to fit the same, as shown. Thus their displacement will be impossible. The band in this instance should be a conductor of electricity, making contact with the supports at their ends. Other electrical conductors may, however, be used.

It will be noticed that, as already stated, in all forms of my electrode the width of the metal extends crosswise of the completed plate. This feature characterizes my invention.

If metal be used as the material from which the supports are made, it may be cast or rolled, as preferred.

I claim—

1. An electrode comprising, essentially, a support folded upon itself in a zigzag form, each fold whereof extends entirely across the electrode, and having its greatest width crosswise of the electrode, active material placed between the folds of the support, and a sustaining band or clasp at the edges of the electrode, substantially as set forth.

2. An electrode comprising a plurality of supports for the active material, active material between the several supports, and a frame surrounding and sustaining the electrode, the ends of each support being adapted to engage with the surrounding frame in such a manner as to require no other means of holding it in place.

Signed at New York, in the county of New York and State of New York, this 1st day of February, A. D. 1890.

ALBERT E. WOOLF.

Witnesses:
PHILLIP ABBOTT,
FREDERICK SMITH.